(12) United States Patent
Sauvinet et al.

(10) Patent No.: US 11,400,799 B2
(45) Date of Patent: *Aug. 2, 2022

(54) SLIDING LAMINATED GLAZING UNIT WITH INTERIOR PROJECTION

(71) Applicant: SAINT-GOBAIN GLASS FRANCE, Courbevoie (FR)

(72) Inventors: Vincent Sauvinet, Grenoble (FR); Vincent Jamet, Aubervilliers (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 325 days.

This patent is subject to a terminal disclaimer.

(21) Appl. No.: 16/344,249

(22) PCT Filed: Oct. 24, 2017

(86) PCT No.: PCT/FR2017/052936
§ 371 (c)(1),
(2) Date: Apr. 23, 2019

(87) PCT Pub. No.: WO2018/078280
PCT Pub. Date: May 3, 2018

(65) Prior Publication Data
US 2019/0248216 A1    Aug. 15, 2019

(30) Foreign Application Priority Data
Oct. 28, 2016    (FR) ...................................... 1660486

(51) Int. Cl.
*B60J 1/17*    (2006.01)
*B32B 17/10*    (2006.01)
(Continued)

(52) U.S. Cl.
CPC ............... *B60J 1/17* (2013.01); *B32B 17/061* (2013.01); *B32B 17/10036* (2013.01);
(Continued)

(58) Field of Classification Search
CPC ........... B60J 1/17; B60J 1/008; B32B 17/061; B32B 17/10036; B32B 17/10137; B32B 17/10293; B32B 2605/006
See application file for complete search history.

(56) References Cited

U.S. PATENT DOCUMENTS 3,592,726 A    7/1971    Blizard
4,091,001 A *  5/1978    Berger ................. C09D 163/00
                                           528/307
(Continued)

FOREIGN PATENT DOCUMENTS

EP    0 600 766 A1    6/1994
EP    0 908 302 A2    4/1999
(Continued)

OTHER PUBLICATIONS

International Search Report as issued in International Patent Application No. PCT/FR2017/052936, dated Jan. 25, 2018.
(Continued)

*Primary Examiner* — Travis M Figg
(74) *Attorney, Agent, or Firm* — Pillsbury Winthrop Shaw Pittman LLP

(57) ABSTRACT

An automotive glazing unit includes a glazing and a system for allowing the glazing to be moved translationally with respect to a door of the vehicle. The glazing is curved and laminated and includes an exterior and an interior glass sheet and a plastic sheet located between the exterior and interior glass sheets. Each sheet has a peripheral edge face. The interior glass sheet is a glass sheet that has undergone a chemical tempering operation and has a thickness included between 0.40 and 2.10 mm and the edge face of the interior glass sheet is located beyond the edge face of the plastic
(Continued)

sheet and beyond the edge face of the exterior glass sheet over at least one portion of the length of the edge face of the interior glass sheet.

15 Claims, 3 Drawing Sheets

(51) Int. Cl.
    *B60J 1/00*     (2006.01)
    *B32B 17/06*     (2006.01)

(52) U.S. Cl.
    CPC .. *B32B 17/10137* (2013.01); *B32B 17/10293* (2013.01); *B60J 1/008* (2013.01); *B32B 2605/006* (2013.01)

(56) References Cited

U.S. PATENT DOCUMENTS

| | | | | |
|---|---|---|---|---|
| 4,775,570 | A * | 10/1988 | Ohlenforst | B32B 17/10761 52/800.14 |
| 4,901,476 | A * | 2/1990 | Nagashima | B60J 10/79 49/501 |
| 5,083,832 | A * | 1/1992 | Ohya | B60J 10/75 49/502 |
| 5,613,325 | A * | 3/1997 | Mariel | B60J 10/74 49/404 |
| 6,361,101 | B1 * | 3/2002 | Yoshizawa | B32B 17/10091 296/200 |
| 6,737,151 | B1 * | 5/2004 | Smith | E06B 3/5454 156/99 |
| 2002/0020117 | A1 | 2/2002 | Cabanne | |
| 2012/0025559 | A1 * | 2/2012 | Offermann | B32B 17/10174 296/84.1 |
| 2012/0038843 | A1 * | 2/2012 | Jung | G02F 1/134336 349/143 |
| 2012/0328843 | A1 * | 12/2012 | Cleary | C03C 3/083 428/213 |
| 2013/0295357 | A1 * | 11/2013 | Cleary | B32B 17/10036 428/215 |
| 2015/0017368 | A1 * | 1/2015 | Kondou | B29C 45/1671 428/38 |
| 2015/0111016 | A1 * | 4/2015 | Fisher | B32B 17/10137 428/215 |
| 2015/0158275 | A1 | 6/2015 | D'Errico et al. | |
| 2016/0354996 | A1 * | 12/2016 | Alder | B32B 17/10091 |

FOREIGN PATENT DOCUMENTS

| | | |
|---|---|---|
| EP | 1 178 175 A1 | 2/2002 |
| FR | 2 525 677 A1 | 10/1983 |
| WO | WO 01/98613 A2 | 12/2001 |
| WO | WO 2014/029605 A1 | 2/2014 |

OTHER PUBLICATIONS

Non-Final Office Action as issued in U.S. Appl. No. 16/344,275, dated Jul. 15, 2021.

Notice of Allowance as issued in U.S. Appl. No. 16/344,275, dated Nov. 12, 2021.

* cited by examiner

SLIDING LAMINATED GLAZING UNIT WITH INTERIOR PROJECTION

CROSS REFERENCE TO RELATED APPLICATIONS

This application is the U.S. National Stage of PCT/FR2017/052936, filed Oct. 24, 2017, which in turn claims priority to French Patent Application No. 1660486 filed Oct. 28, 2016, the entire contents of all applications are incorporated herein by reference in their entireties.

The present invention relates to an automotive glazing unit, in particular for a motor vehicle, including a glazing and means for allowing said glazing to be moved translationally with respect to a door of said vehicle, said glazing being curved and laminated and comprising at least an exterior glass sheet, an interior glass sheet and a plastic sheet located between said exterior glass sheet and said interior glass sheet, each sheet having a peripheral edge face.

A window with a laminated glazing the interior glass sheet of which has an interior projection with respect to the rest of the laminated glazing is for example known from French patent application No. FR 2 525 677. This projection serves as a protruding, guiding means that is intended to slide in a recessed profile of the door during the translational movement of the glazing unit, such that the exterior face of the glazing unit is flush with the structure of the door when the glazing unit is closed.

It would appear that this window has never been implemented industrially.

One plausible explanation is that the window according to this document causes more problems than it solves: for a given opening, which must be closed by a sliding laminated glazing unit, providing a projection for this laminated glazing unit causes more problems than providing, for the same opening, a laminated glazing unit of the same total thickness and with no projection.

Specifically, with respect to a laminated glazing unit with no projection, when it is desired for the laminated glazing unit to have a projection, it is necessary to make provision, for a given opening:

both for the exterior glass sheet to be smaller than the glazing unit with no projection;
and for the interior glass sheet to be larger than in the laminated glazing unit with no projection.

It is necessary to perform these two operations as otherwise the projection-comprising laminated glazing unit may not be correctly held in an opening of given nominal dimensions:

if it is chosen to make provision solely for the exterior glass sheet to be smaller than the laminated glazing unit with no projection, then it is necessary to decrease the dimensions of the opening; and
if it is chosen to make provision solely for the interior glass sheet to be larger than the laminated glazing unit with no projection, then it is necessary to increase the dimensions of the opening;

each of these two operations is to be avoided because each would require the overall appearance of the vehicle to be modified.

The two operations above, which are essential if the size of the opening is not be changed, are not carried out to equal effect; in order for the laminated glazing unit to be correctly held in the opening without modification of the dimensions of this opening, or modification of the thicknesses of the constituent components of the laminated glazing, then it is necessary:

for the exterior glass sheet to be only a little bit smaller than the laminated glazing unit with no projection (with for example an area decreased by 2%); and
for the interior glass sheet to be definitely larger than in the laminated glazing unit with no projection (with, in this example, an area increased by 5%).

Therefore, the decrease in the size of the exterior glass sheet is not compensated for by the increase in the size of the interior glass sheet: as the size of the interior glass sheet is increased more, in proportion, than the size of the exterior glass sheet is decreased, in the end, more glass is needed and the weight of the projection-comprising laminated glazing unit is increased.

This increase in the weight of the glazing unit is disadvantageous because it leads to an increase in the consumption of the vehicle and because it is then necessary to design stronger means for moving the glazing unit translationally.

It is moreover known to produce a window with a laminated glazing with means for allowing said glazing to be moved translationally with respect to a vehicle door that has no top jamb, or is missing one lateral jamb, or that even has no lateral jambs.

In these windows, in closed position, the glazing unit is hardly, or even not at all, held at the top and laterally by the door, but is held in this position by means located directly on the body, in the body portion adjacent to the door when the door is closed (portion called the "body opening").

In this regard, prior art is known from European patent No. EP 1 178 175, which relates to a system for positioning and for assembly with a very complex glazing including:

an adapter element having a first extension lying in the extension of the glazing and a second extension extending in the longitudinal direction of the glazing unit;
a carriage element guided in at least one rail that is securely fastened to a door of the vehicle and driven by a driving device housed in said door; said carriage being equipped with a third extension in the longitudinal direction of the glazing, with at least one guiding block that is securely fastened to an element of the driving device and guided along a rail, and with a vertical wall having a first vertical contact surface liable to interact with one of the faces of the first extension of the adapter element the second extension of which interacts with the third extension of the carriage so as to allow a small relative movement between the adapter and the carriage under the action of a longitudinal force applied to the glazing unit before it is fastened in place;
a trapping element comprising a contact surface; and
a fastening means that interacts with the trapping element so as to block the first extension of the adapter between said first and second contact surfaces.

Thus, during the installation of the glazing unit in the door, the glazing unit can be adjusted in the vertical direction of the vehicle by moving the adapter between the carriage and the trapping element and in the longitudinal direction by virtue of the action of the third extension of the carriage on the second extension of the adapter.

This solution is tedious to implement and leads to too great a loss of time for motor-vehicle manufacturers, who would like their automobiles to be assembled as quickly as possible.

Various solutions for glazing/glazing holder and glazing holder/driving mechanism assembly are moreover known from international patent application No. WO 01/98613.

This document in particular discloses that, once the glazing holder has been securely fastened to the glazing, it is possible for the geometry of the glazing holder to be adjusted by removing material, in order to modify the relative position of the glazing-door with respect to the driving mechanism (movable carriage).

This document also discloses that using a glazing holder that admits of a small amount of play in the direction normal to the glazing unit allows differences in glazing-unit shape to be compensated for via a modification of the position of the glazing holder with respect to the glazing. The glazing holder is fastened to the glazing, using two adhesives, a slow-setting adhesive and a fast-setting adhesive, after relative movement of one with respect to the other to a suitable position.

Prior art is also known from patent application EP 908 302, which discloses a laminated glazing unit an interior glazing of which has an edge that lies beyond the edge of the exterior glazing, this interior glazing being thermally tempered; however, in this document, the glazing unit is not a movable glazing unit but a glazing unit that is fixed in place, and the thermal temper has the aim of facilitating complete breakage of the glazing unit, in order to allow escape through the opening, this being a context that is very different from that of movable glazing units since, in order to allow escape through the opening of a movable glazing unit, it is enough to wind it down.

Lastly, prior art is known from international patent application No. WO 2014/029605, which discloses a movable laminated glazing unit the interior glass sheet of which is thin and may be chemically tempered. This document also indicates the presence of a projection but the latter is formed by the thick exterior glass, which is necessarily tempered and curved.

This document insists on the fact that the thin glass sheet does not participate actively (but only passively) in the curvature and general appearance of the glazing unit.

The aim of the invention is to provide a translationally movable glazing structure that is not only light but also robust, effective, easy to manufacture and easy to implement.

Surprisingly, it has been discovered that it is possible to use a laminated glazing with, in order to decrease the weight of the glazing unit, a thin interior glazing, to carry out, before the lamination, a chemical temper of this interior sheet in order to increase its mechanical strength, and to furthermore provide this chemically tempered thin interior glazing with at least one interior projection in order to further decrease the weight of the glazing and also allow a glazing unit that remains flush with the door, or even with the adjacent body (case for a door with no jamb(s)), to be produced.

The present invention thus relates, in its broadest possible acceptance, to an automotive glazing unit according to claim 1, the dependent claims disclosing advantageous variants. This glazing unit includes a glazing and means for allowing said glazing to be moved translationally with respect to a door of said vehicle that has no jamb(s) in an upper portion, said glazing being curved and laminated and comprising at least an exterior glass sheet, an interior glass sheet, and a plastic sheet located between said exterior glass sheet and said interior glass sheet, each sheet having a peripheral edge face, this glazing unit being noteworthy in that said interior glass sheet is a glass sheet having undergone a chemical tempering operation and having a thickness comprised between 0.40 and 2.10 mm, or even between 0.40 and 1.80 mm, or even between 0.40 and 1.60 mm and in that the edge face of said interior glass sheet is located beyond the edge face of said plastic sheet and beyond the edge face of said exterior glass sheet over at least one portion (i.e. over at least one portion/on at least one edge, or over a plurality of portions/on a plurality of edges or on the entirety/periphery) of the length of the edge face of said interior glass sheet.

The glazing is a laminated glazing in the sense that there is no gas-filled cavity or vacuum cavity between the sheets that form the glazing.

The interior glass sheet has a thickness that is no larger than that of the exterior glass sheet; it is at most equal to, and preferably smaller than, that of the exterior glass sheet.

Said interior glass sheet may have a thickness smaller than the thickness of 2.10 mm and have a thickness comprised between 0.40 mm and 2.00 mm; it may in particular have a thickness comprised between 0.40 and 1.10 mm, or even between 0.40 and 0.70 mm. Its thickness must be sufficient to have a positive effect on the mechanical strength and the rigidity of the glazing but must not be too large in order not to too greatly increase the weight of the glazing. Said interior glass sheet may for example have a thickness of 0.40 mm, or 0.55 mm, or 0.70 mm, or 1.10 mm, or 1.60 mm.

In the present document, regarding the mentioned ranges, the limits of the ranges are included in the ranges.

The expression "edge face" or "end face" designates the narrow side of a sheet, which is located substantially transversely between the two main faces of a sheet.

The fact that the edge face of said interior glass sheet is located beyond both the edge face of the plastic sheet and the edge face of said exterior glass sheet along at least one portion of its length makes it possible to make said interior glass sheet project with respect to said plastic sheet and said exterior glass sheet. This projection may be peripheral in the sense that it is present on all of the periphery of the glazing, but it may also be partial and thus be present only along one portion of the periphery of the glazing; it may also be present along a plurality of portions of the periphery of the glazing; it may in particular not be present along the bottom edge of the glazing.

This projection is provided in a visible portion of the glazing unit; in a portion that may be seen by the users of the vehicle. This projection may not be present in a portion of the glazing unit that remains hidden in the interior of the body of the vehicle, whatever the state (open, closed, or between open and closed) of the glazing with respect to the body element that bears it.

The present invention is thus based on the surprising discovery that in a movable laminated glazing unit, the thin and chemically tempered interior glass sheet can be present alone in a location of the thickness of the glazing (in the location of the projection: with no plastic interlayer sheet, or exterior glass sheet) and thus can optionally be, in this location, the only part of the glazing unit that interacts with a jamb of the body (main portion or door jamb) when the opening that the glazing unit is intended to close is closed thereby.

In one particular application of the invention, the door of said vehicle has no jamb(s), at least in an upper portion.

The edge face of said interior glass sheet preferably includes a protective layer on at least one portion of the length of that edge face of said interior glass sheet which lies beyond the edge face of said plastic sheet and beyond the edge face of said exterior glass sheet and preferably the edge face of said interior glass sheet includes a protective layer over the entirety of the length of that edge face of said interior glass sheet which is located beyond the edge face of said plastic sheet and beyond the edge face of said exterior glass sheet. Thus, the protective layer both protects the interior glass sheet located below and provides protection during handling in order to decrease the sharp character of the thin interior glass sheet.

Said protective layer is a partial layer in the sense that it is not present on the entirety of the exterior face or of the interior face of the interior glass sheet that bears it; when it is present on a portion of an exterior and/or interior face of the interior glass sheet, the protective layer is present on only a very small portion of this face (less than 1/10th of the area of this face), in order not to disadvantageously decrease the vision area of the glazing.

The edge face of said interior glass sheet preferably includes a protective layer that extends over a distance against an exterior face of said interior glass sheet and/or against an interior face of said interior glass sheet, said distance being comprised between 2.0 and 30.0 mm, or even between 3.0 and 20.0 mm and furthermore preferably remaining constant on the exterior face of said interior glass sheet and/or constant on the interior face of said interior glass sheet, for providing a more effective protection.

The edge face of said interior glass sheet may include a protective layer that extends over a distance against an interior face of said interior glass sheet that is larger than a projection distance of the edge face of said interior glass sheet with respect to the edge face of said plastic sheet and to the edge face of said exterior glass sheet in order to provide more effective protection; this distance may be comprised between 3.0 and 40.0 mm, or even between 4.0 and 30.0 mm, in particular when said distance over which the protective layer extends is comprised between 2.0 and 30.0 mm, or even between 3.0 and 20.0 mm, respectively.

This protective layer may in particular make contact with the edge face of said plastic sheet, or even also with the edge face of said interior glass sheet in order to provide even more effective protection.

Said protective layer may be a varnish having a thickness of about 0.1 to 3.0 mm, which is easy to apply, or may be a part made of plastic or of metal or of metal alloy. This part may be manufactured beforehand then wedged onto or adhesively bonded to the exterior glass sheet after manufacture of the glazing (after the lamination); when it is made of plastic, it may be manufactured in situ, for example by in situ extrusion or in situ encapsulation. Such a part makes the glazing unit more complex but may allow more effective protection to be achieved.

Preferably, the edge face of said interior glass sheet lies beyond the edge face of said plastic sheet and beyond the edge face of said exterior glass sheet at least in the top portion of said glazing unit.

In one advantageous and independent variant, the edge face of said interior glass sheet lies beyond the edge face of said plastic sheet and beyond the edge face of said exterior glass sheet over only one portion of the length of the edge face of said interior glass sheet. The edge face of said interior glass sheet may lie beyond the edge face of said plastic sheet and beyond the edge face of said exterior glass sheet over a plurality of portions of the length of the edge face of said interior glass sheet but, in this independent variant, the edge face of said interior glass sheet does not lie beyond the edge face of said plastic sheet and beyond the edge face of said exterior glass sheet over the entirety of the length of the edge face of said interior glass sheet.

Thus, the glazing is easier to manufacture because the one (or more) portion(s) of the edge face of said interior glass sheet that does (do) not lie beyond the edge face of said plastic sheet and beyond the edge face of said exterior glass sheet may be such that the edge face of said interior glass sheet is then aligned with the edge face of said plastic sheet and with the edge face of said exterior glass sheet; this (these) portion(s) may then serve as reference portion(s) for the positioning of the interior glass sheet with respect to the two other sheets during the manufacture of the glazing (lamination).

Furthermore, this (these) one (or more) portion(s) may be located facing means allowing said glazing to be moved translationally with respect to the door of said vehicle (i.e. the one or more glazing holders) in order to increase the mechanical strength of the glazing in this (or these) location(s).

In one specific variant, the edge face of said interior glass sheet is aligned with the edge face of said exterior glass in a bottom portion of the glazing unit; for example, in a bottom portion that remains in the interior of said door when said glazing unit is closed.

In particular, the edge face of said interior glass sheet may be aligned with the edge face of said exterior glass sheet along the bottom glazing-unit edge.

The edge face of said interior glass sheet lies beyond the edge face of said exterior glass sheet so that a centripetal offset of size comprised, preferably, between 2.0 and 30.0 mm, or even between 3.0 and 20.0 mm, is formed said offset furthermore preferably being constant along its length, in order to be more discreet, aesthetically.

In one particular variant, the edge face of said interior glass sheet lies beyond the edge face of said exterior glass sheet so that a centripetal offset is formed along both the entirety of a top portion and along one portion only of a single lateral edge, or indeed so that a centripetal offset is formed along both the entirety of a top portion and along one portion only of two lateral edges of said glazing unit.

Advantageously, the present invention allows sliding glazing units equipped with glazing holders to be manufactured that are not only very strong by virtue of the laminated structure of the glazing, one sheet of which is chemically tempered, but that are also both very light, by virtue of the small thickness of this chemically tempered sheet, and furthermore easy to guide translationally by virtue of the centripetal projection of the interior sheet with respect to the rest of the laminated glazing.

The present invention was developed for glazing units incorporated into doors having lateral jambs and an upper jamb level with the glazing unit when the latter is wound up (closed), but it may also be used for glazing units incorporated into doors having no lateral and upper jambs level with the glazing unit when the latter is wound up.

Advantageously above all, the present invention makes it possible to produce a glazing unit that, when it is closed, includes an exterior face that lies flush with the peripherally adjacent body portion (portion of the door, or portion of the body directly if the door has no jambs peripherally to the glazing unit); this type of glazing unit is known as "flush glazing".

The present invention will be better understood on reading the detailed description below of nonlimiting embodiments and the appended figures.

Figure 1:
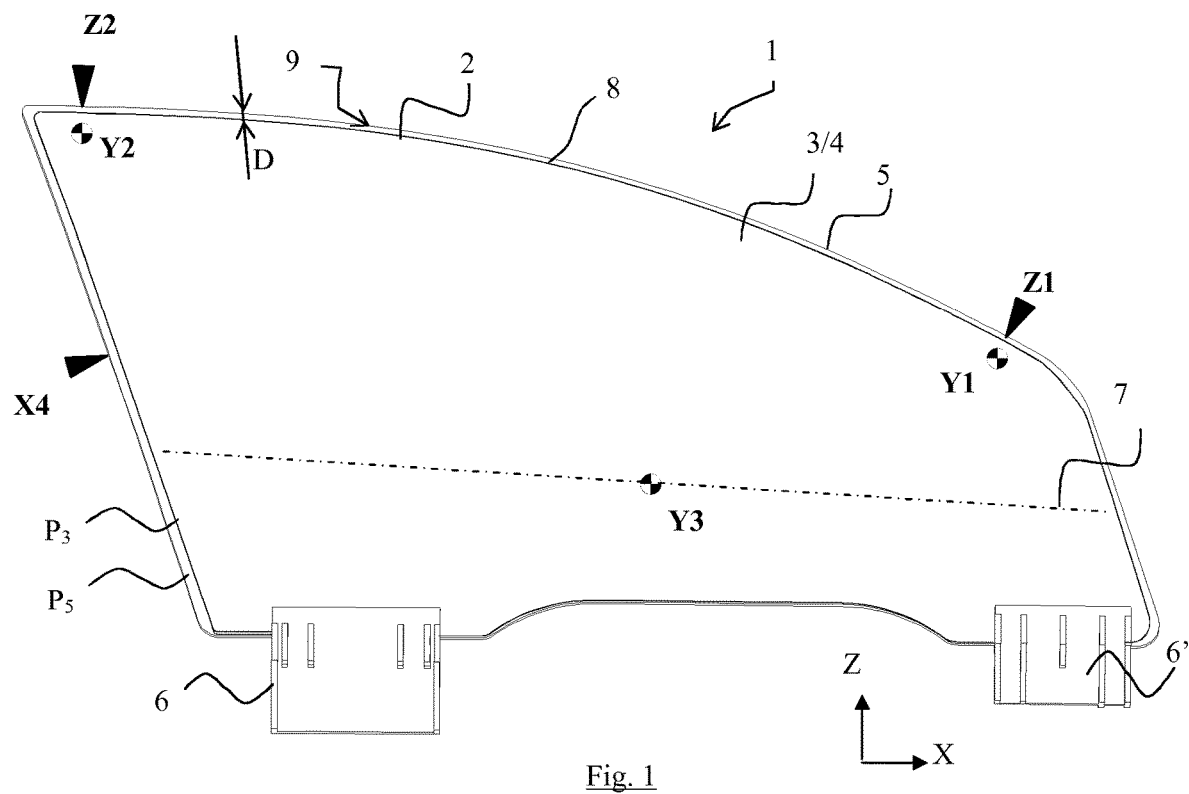
FIG. 1 illustrates an exterior face-on view of a front automotive glazing unit according to the invention, equipped with two glazing holders.
Figure 4:
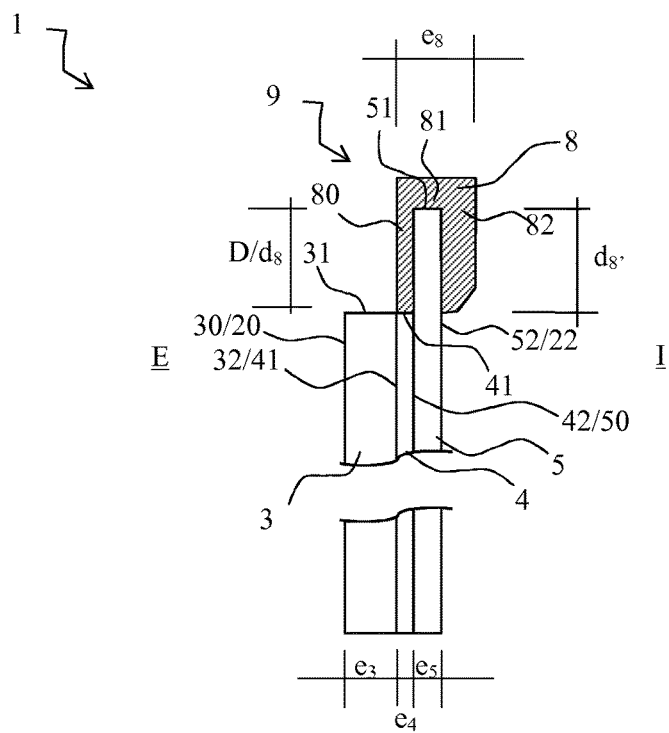
Figure 5:
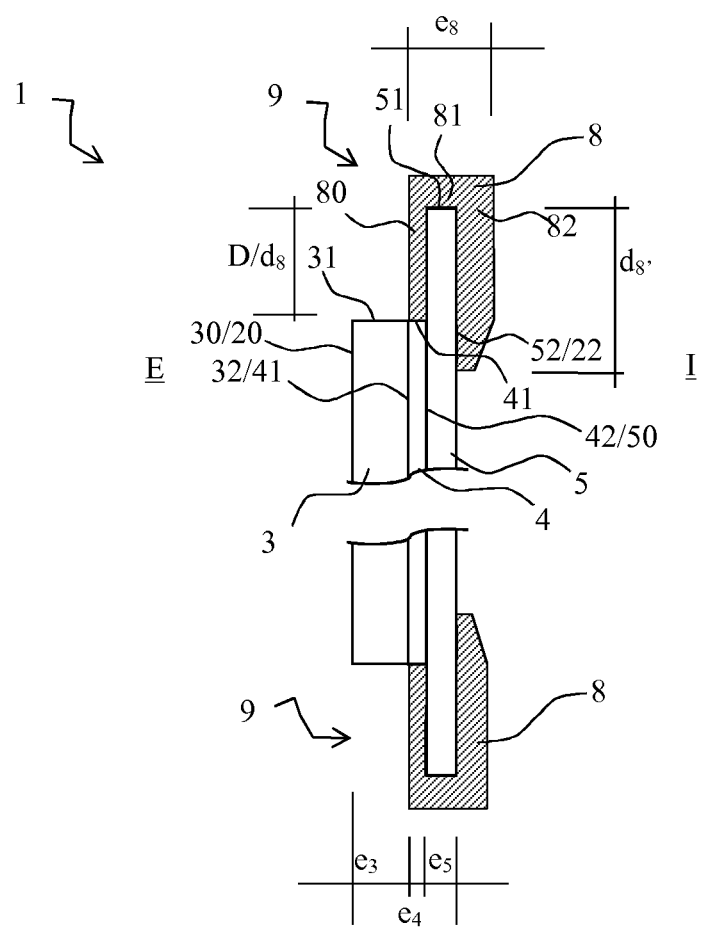

FIG. 4 illustrates a partial vertical transverse cross-sectional view of the glazing unit of FIG. 1 between the two glazing holders and without these glazing holders, this glazing unit comprising a projection in the top portion thereof but no projection in the bottom portion thereof; and FIG. 5 illustrates a partial vertical transverse cross-sectional view of a variant of FIG. 4; the glazing unit including a projection in the top portion thereof and also in the bottom thereof.

It will be noted that the various elements shown in the figures have not been drawn to scale for the sake of readability.

FIG. 1 illustrates a right-hand side glazing unit 1 of a vehicle, according to the invention, drawn as seen from the exterior of the vehicle.

It is in particular a side glazing unit of a door of a motor vehicle that is translationally movable with respect to this door substantially vertically between an open position in which the glazing unit is located entirely or almost entirely in the interior of the door and a closed position in which the glazing unit closes an opening of the door.

Thus, when closed, this glazing unit forms a vertical separation between an interior space I that is in the interior of the vehicle and an exterior space E that is on the exterior of the vehicle.

The notions "exterior" and "interior" are therefore considered in the present document with respect to this exterior space E and this interior space I, respectively.

As it is a question of a side glazing unit, the latter for the most part extends along the axis generally called the "X-axis" of the vehicle, which is the central longitudinal axis of advance of the vehicle equipped with the glazing unit according to the invention as a side glazing unit on the right-hand side of the vehicle and which corresponds to the horizontal axis in the plane of the paper in FIG. 1.

In the context of the present document, the notions "centripetal" and "centrifugal" are considered, in the plane of the paper in FIG. 1, to be expressed with respect to the center of the glazing unit, along the X and Z axes; the centrifugal direction points in the direction of this center whereas the centripetal direction is away from this center.

In the embodiment of FIG. 1, the glazing unit 1 is unitarily formed.

In the example embodiment illustrated, the glazing unit 1 includes a glazing 2 that is curved (i.e. not flat) and laminated. However, for greater simplicity, in the drawings of FIGS. 1, 4 and 5 the glazing 2 is considered to be flat.

The glazing 2 of the glazing unit 1 is a laminated glazing that includes, from the exterior to the interior, at least, in this order: an exterior glass sheet 3, a plastic interlayer sheet 4 then an interior glass sheet 5; however, it is possible for at least one other sheet to be inserted between the exterior glass sheet 3 and the plastic interlayer sheet 4 or between the plastic interlayer sheet 4 and the interior glass sheet 5.

The exterior glass sheet 3 has an exterior face 30 that is oriented toward the exterior E, an interlayer face 32 that is oriented toward the plastic interlayer sheet 4, and a peripheral edge face 31 that is located between these two faces.

The interior glass sheet 5 has an interlayer face 50 that is oriented toward the plastic interlayer sheet 4, an interior face 52 that is oriented toward the interior I and a peripheral edge face 51 located between these two faces.

The plastic interlayer sheet 4 has an exterior interlayer face 40 that is oriented toward the interlayer face 32 and that here makes contact with this interlayer face 32, an interior interlayer face 42 that is oriented toward the interlayer face 50 and that here makes contact with this interlayer face 50, and a peripheral edge face 41 that is located between these two interlayer faces 40, 42.

The exterior glass sheet 3 is for example a glass sheet having undergone a thermal bending operation before the manufacture of the laminated glazing 2 and having a thickness $e_3$ comprised between 1.20 and 4.50 mm and for example of 2.10 mm.

The plastic interlayer sheet 4 is for example a sheet made of polyvinyl butyral (PVB) having a thickness $e_4$ comprised between 0.50 and 1.50 mm and for example of 0.78 mm. This plastic sheet 4 preferably has the same length dimension along the X-axis and height dimension along the Z-axis as the exterior glass 3.

The interior glass sheet 5 is a glass sheet having undergone a chemical tempering operation and having a thicknesses comprised between 0.40 and 2.10 mm, or even comprised between 0.40 and 2.00 mm, or even between 0.40 and 1.80 mm, or even between 0.40 and 1.60 mm and for example of 1.00 mm.

Preferably, the interior glass sheet 5 is not curved before the manufacture of the laminated glazing 2; it is this lamination that will give it its curved shape, by making it conform to the shape of the exterior glass sheet 3. This is made possible by virtue of the small thickness of the interior glass sheet.

In the case where the glazing 2 includes one or more other sheets in addition to the aforementioned three, the interior glass sheet 5 that has undergone a chemical temper is the sheet of the laminated glazing that is interiormost.

The glazing unit 1 includes, apart from the glazing 2, along at least one portion of at least one bottom edge, means for allowing the glazing 2 to be move translationally with respect to a door of the vehicle. These means comprise at least one and preferably at least two glazing holders 6, 6' for example having, in transverse cross section, a substantially upside-down h shape.

Figure 2:
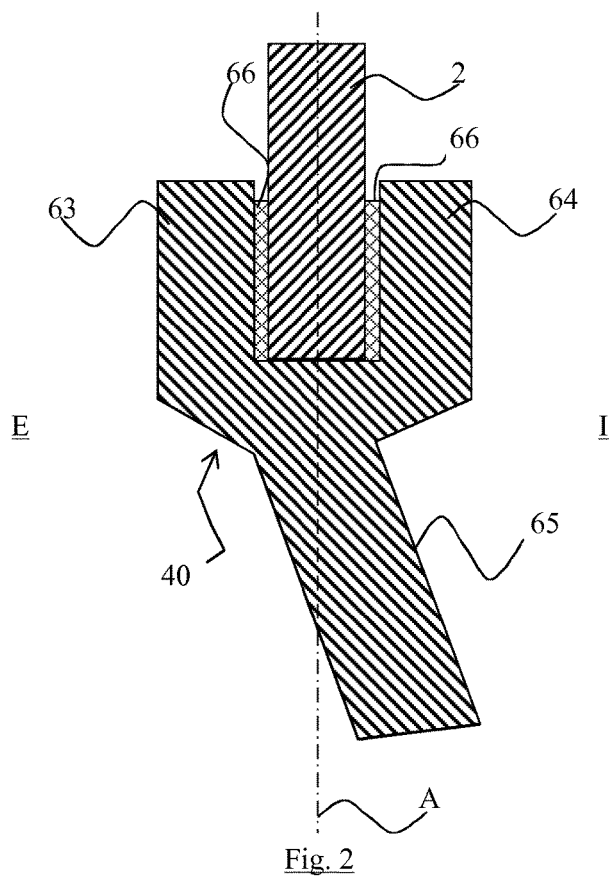
FIG. 2 illustrates a vertical transverse cross-sectional view of a glazing holder of FIG. 1.

FIG. 2 illustrates a detailed view of the glazing holder 6 of FIG. 1. This glazing holder 6 thus has:

a first portion consisting of two parallel walls 63, 64 that are connected at their base and forming a longitudinal groove, i.e. forming a U shape in transverse cross section; and a second portion consisting of a tail 65 extending away from the parallel walls 63, 64 with respect to the base connecting these walls.

In the illustrated version, assembly is carried out so that said parallel walls 63, 64 of said h shape clasp the lower portion of said glazing 2, the tail 65 then being located substantially in the extension of the glazing 2.

This h shape of the glazing holder is particularly advantageous because it allows forces to be transmitted between the glazing holder and the glazing over a large area corresponding to the sum of the interior areas of the parallel walls 63, 64; however, it is entirely possible to use a single platen, this platen for example having at least two portions: a first portion for interacting with the glazing and a second portion for interacting with the mechanism for driving (raising/lowering) the glazing.

In FIG. 2, the glazing 2 is curved and the parallel walls 63, 64 and the tail 65 are planar; however, it is possible for the parallel walls 63, 64 and/or the tail 65 to be curved. The tail 65 extends approximately from the midpoint of the base connecting the parallel walls 63, 64, but it is also possible to position the tail 65 in the extension of either one of the parallel walls 63, 64.

In FIG. 2, the tail 65 is not parallel to the walls 63, 64. The axis A illustrates the midplane of the glazing unit 1 at its lower end when the latter is correctly positioned with respect to the glazing holder 6; the tail 65 is oriented with a nonzero angle with respect to the axis A, which angle depends on the curvature of the glazing 2.

The tail 65 is intended to be connected to a motorized driving system (not illustrated) in order to allow the glazing unit 1 to be raised and lowered in the door of the vehicle.

The glazing holders 6, 6' and the glazing 2 are assembled on a template allowing tolerances in the glazing holder 6/glazing 2 assembly to be controlled.

Figure 3:
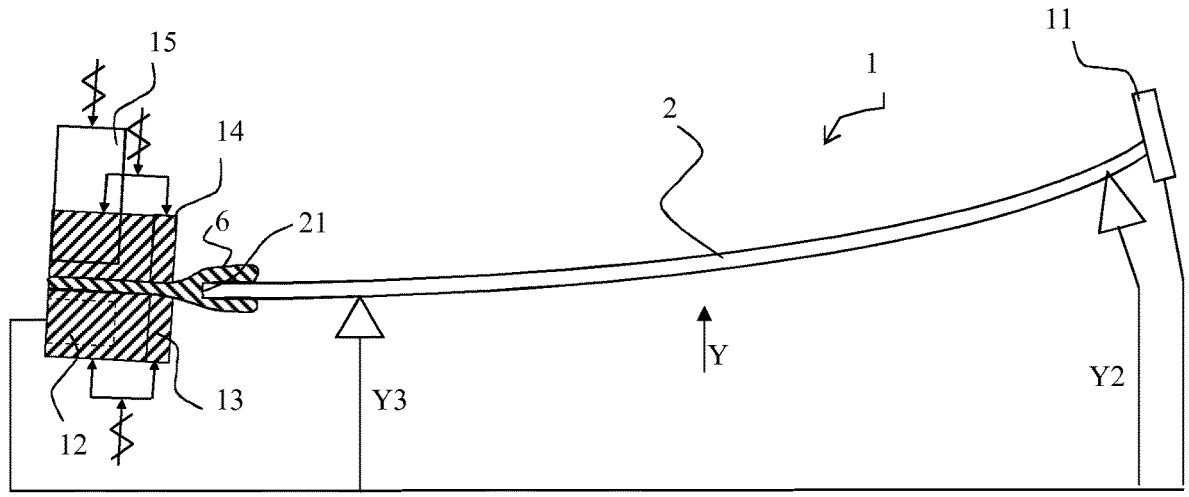
FIG. 3 illustrates a profile view of a front automotive glazing unit equipped with two glazing holders according to the invention during the operation of installation of a glazing holder.

Before the glazing holders are positioned and fastened in place, the glazing 2 is first correctly positioned ("focused") in a mounting template 11 (shown in FIG. 3) comprising a plurality of positioning abutments, according to the isostatism in Z1, Z2, Y1, Y2, Y3 and X4 illustrated in FIG. 1.

The point Y3 is, preferably, positioned on the line of a window seal 7 illustrating the position of this bottom contact seal with the door when the glazing unit is closed.

A matrix 12, illustrated in dotted lines, and which is securely fastened to the reference system of the glazing 2, accommodates the tail 65 of each glazing holder 6.

Lower 13 and upper 14 movable jaws then clamp the tail 65.

Whatever the orientation of the glazing holders 6 in the Y direction, the movable jaws 13, 14 trapp the glazing holder 6 without deteriorating the isostatism described above.

The one (or more) glazing holder(s) 6, 6' is (are) adhesively bonded using an adhesive, for example polyurethane, then "wedged" onto the glazing 2, i.e. it is (they are) positioned so that the glazing is present in the U shape, optionally in abutment, by inserting between said parallel walls 63, 64 and the glazing 2 inserts 66 made of plastic, such as for example of polypropylene.

In one variant, it is proposed to replace the phase of positioning added inserts 66 with a phase of injection molding in-situ adhesive material intended to form the inserts 66, made of thermoplastic hotmelt resin, for example based on polyamide.

The injection of the inserts when the glazing and the glazing holders are correctly positioned with respect to one another thus guarantees the position of the glazing holder, whatever the curvature of the glazing.

The hotmelt resin used has an elastic limit of about 5.5 N/mm$^2$ and a yield strength of 11 N/mm$^2$, calculated according to standard DIN 53455. It must be used at a temperature of about 220° C. and has at this temperature a viscosity of about 5000 mPa·s, measured according to standard ASTM D 3236.

During the implementation of this solution, it is also possible to use an additional adhesive to perfectly fasten the insert to the parallel walls and the glazing.

The inserts 66, which are added or manufactured in situ by injection molding, thus serve to hold the glazing 2 in place relative to the parallel walls 63, 64 with respect to lateral forces.

The glazing holders used are, preferably, made of aluminum alloy. By way of example, with a 6060 aluminum alloy (AGS), a vertical compressive force of 30 to 50 tonnes is enough, i.e. divided by the size of the glazing holders, pressures of about 150 GPa for h-shape glazing holders of overall size of about 40×30 mm and of about 450 GPa for h-shape glazing holders of overall size of about 60×60 mm.

The glazed element 2 has an exterior face 20 that is formed by the exterior face 30 of the exterior glass sheet 3, an interior face 22 that is formed by the interior face 52 of the interior glass sheet 5 and a peripheral edge face 21 located between these two faces, corresponding to the peripheral edge face 31 of the exterior glass sheet 3, to the peripheral edge face 41 of the plastic sheet 4 and to the peripheral edge face 51 of the interior glass sheet 5.

According to the invention, the edge face 51 of the interior glass sheet 5 is located beyond, in a centripetal direction, the edge face 41 of said plastic sheet 4 and beyond the edge face 31 of the exterior glass sheet 3 over at least one portion of the length of the edge face 51 of the interior glass sheet 5, i.e. along at least one portion of the length of the edge face 51 of the interior glass sheet 5.

Thus, the interior glass sheet 5 has at least a height along the Z-axis and/or a length along the X-axis that is (are) larger than that (those) of the exterior glass sheet 3.

Preferably, the edge face 51 of the interior glass sheet 5 is located, in a centripetal direction, beyond the edge face 41 of the plastic sheet 4 and beyond the edge face 31 of the exterior glass sheet 3, at least in the top portion of the glazing unit.

The edge face 51 of said interior glass sheet 5 is thus located beyond, in a centripetal direction, the edge face 31 of said exterior glass sheet 3 (and beyond the edge face 41 of the plastic sheet 4) so that a centripetal offset 9, or projection, is formed. This offset may be comprised between 2.0 and 30.0 mm, or even between 3.0 and 20.0 mm, and for example here is 2.85 mm; this offset 9 is preferably constant along its length.

In FIG. 1, the window seal 7 marks the top of the cavity of the door, into the interior of which cavity the glazing unit 1 slides when the glazing is closed. In this closed glazing-unit position, all that portion of the glazing unit which is located under this window seal 7 may have no offset: in this portion under the window seal 7, in the interior of the cavity of the door when the glazing unit is closed, it is possible for the edge face 51 of the interior glass sheet 5 over one (or more) portion(s) of its length, or even over the entirety of its length, to be aligned with the edge face 31 of the exterior glass sheet 3.

It is for example possible for the edge face 51 of the interior glass sheet 5 to be aligned with the edge face 31 of the exterior glass sheet 3 only in the places where the means for allowing the glazing 2 to be moved translationally with respect to a door of the vehicle are located.

Above the window seal 7 the door of the vehicle may include at least one portion with no jamb(s). Thus, it is possible for the door:
  to not include a front lateral jamb and for it to be the adjacent body portion, also called "the A pillar", that guides the glazing unit; and/or
  to not include a rear lateral jamb and for it to be the adjacent body portion, also called "the B pillar", that guides the glazing unit.

The edge face 51 of the interior glass sheet 5 preferably includes a protective layer 8 over at least one portion of the length of that edge face 51 of the interior glass sheet 5 which is located, in a centripetal direction, beyond the edge face 41 of the plastic sheet 4 and beyond the edge face 31 of the exterior glass sheet 3.

Also preferably, this protective layer 8 is present over the entirety of the length of that edge face 51 of the interior glass sheet 5 which is located beyond the edge face 41 of the plastic sheet 4 and beyond the edge face 31 of the exterior glass sheet 3.

The protective layer 8 furthermore preferably extends over a distance $d_8$, $d_{8'}$ against an exterior face 50 of the interior glass sheet 5 and/or respectively against an interior face 52 of the interior glass sheet 5; this distance is preferably comprised between 2.0 and 30.0 mm, or even between 3.0 and 20.0 mm and is furthermore preferably constant on the exterior face 50 of the interior glass sheet 5 and/or on the interior face 52 of the interior glass sheet 5.

Thus, the protective layer preferably has an exterior face 80 that is oriented toward the exterior E, an interior face 82 that is oriented toward the interior I and a peripheral edge face 81 located between these two faces.

The exterior face 80 of the protective layer is preferably substantially parallel to the exterior face 50 of the interior glass sheet 5 in the portion that it covers, the interior face 82 of the protective layer is preferably substantially parallel to the interior face 52 of the interior glass sheet 5 in the portion that it covers and the edge face 81 of the protective layer is preferably substantially parallel to the edge face 51 of the interior glass sheet 5 in the portion that it covers.

Here, the protective layer 8 extends over a distance $d_8$ against an exterior face 50 of the interior glass sheet 5 that is identical to the height of the offset D. Thus, the protective layer makes contact with the edge face 41 of the plastic sheet and also protects this edge face.

The aim of the protective layer 8 is both to protect the edge (i.e. at least one portion of the projection, or even all the projection, or even more than the projection) of the interior glass sheet 5 in order to prevent its degradation and, at the same time, to protect users because of the potentially sharp character of the edge of the interior glass sheet, with regard to its thickness and because of its nature (chemically tempered).

Specifically, the chemical temper may engender ridges between the faces and the edge face that may be sharp.

The protective layer 8 may be a varnish having a thickness of about 0.1 to 3.0 mm, or even 0.2 to 2.0 mm and for example of 0.5 mm; it may also instead or furthermore be a part made of plastic or of metal or metal alloy. It may be manufactured beforehand then wedged onto or adhesively bonded to the exterior glass sheet or be manufactured in-situ when it is made of plastic, for example using an in-situ extrusion technology or encapsulation between two mold portions closed on themselves or even a hybrid extrusion technology guided between two mold portions that are not completely closed on themselves.

The protective layer is here a profile made of plastic having a total thickness $e_8$ equal to at least twice the thicknesses of the interior glass sheet 5.

The protective layer is fastened to the glazing 2 before or after the glazing holders 6, 6' are fastened in place, but in any case before the glazing unit 1 is fastened to the door of the vehicle. This fastening is preferably irreversible in the sense that the protective layer can then not be removed without damaging the glazing unit.

The protective layer may also participate in the aesthetics of the glazing unit by having a suitable (identical) color with respect to the color of the body of the vehicle or by having a chrome-coated appearance.

In the embodiment illustrated in FIG. 1, the edge face 51 of said interior glass sheet 5 is located beyond both the edge face 41 of the plastic sheet 4 and beyond the edge face 31 of the exterior glass sheet 3, over only one portion of the length of the edge face 51 of the interior glass sheet 5. In this instance, the projection is present along the lateral edges and the top edge of the glazing, but is not present along the bottom edge of the glazing.

Thus, as may be seen in FIG. 4, these three edge faces 31, 41, 51 are aligned with one another along the Y-axis in the bottom portion of the glazing, but are not aligned with one another along the Y-axis in the top portion of the glazing: the edge face 51 of the interior glass sheet 5 is offset in the centripetal direction, i.e.:
  along the Z-axis at least along the top edge of the glazing;
  and preferably furthermore along the X-axis at least along the lateral edge of the glazing, or even preferably along the two lateral edges of the glazing.

For example, the edge face 51 of the interior glass sheet 5 may be offset in the centripetal direction, along the top edge of the glazing and along the lateral edge of the glazing that is toward the rear of the vehicle, on the right in FIG. 1, also called "the B pillar".

Each sheet 3, 4, 5 has a peripheral perimeter $P_3, P_4, P_5$ the perimeter of the interior glass sheet 5 lies beyond the perimeter $P_4$ of the plastic sheet 4 and the perimeter $P_3$ of the exterior glass sheet 3 over at least one portion of the length of the perimeter $P_5$ of the interior glass sheet 5.

The perimeter $P_5$ of the interior glass sheet 5 is not aligned with the perimeter $P_3$ of the exterior glass sheet 3 in a top portion of the glazing unit, which is present on the exterior of the panels of the door when the glazing unit is closed: the projection is thus present along the entirety of the periphery of the glazing that is visible from the exterior when the glazing unit is closed.

The perimeter $P_5$ of the interior glass sheet 5 is in lateral alignment with the perimeter $P_3$ of the exterior glass sheet 3 only in a bottom portion of the glazing unit: in the portion of the glazing unit that remains in the interior of said door when the glazing unit is closed, in order to participate in the reinforcement of the glazing in this location with a view to increasing the reliability of the attachment of the glazing holders to the glazing.

This perimeter $P_5$ of the interior glass sheet 5 that is offset in the centripetal direction with respect to the perimeter $P_3$ of the exterior glass sheet 3 and $P_4$ of the plastic sheet 4 makes it possible to use this perimeter $P_5$ to guide the glazing unit 1 in corresponding profiles located facing in the opening of the door when the door includes jambs or in the opening of the body that accommodates the door with respect to which the glazing unit may slide when the door includes partial glazing jambs or includes no glazing jamb(s).

In particular, this perimeter may slide into a U-shaped profile provided in the top portion of the door or the opening when the glazing unit is completely closed.

In one variant, the edge face 51 of the interior glass sheet 5 lies beyond the edge face 31 of the exterior glass sheet 3 so that the centripetal offset 9, or protrusion, is formed along both the entirety of a top portion and along the entirety of an upper edge of the glazing unit and along only one portion of a single lateral edge, or even so that a centripetal offset 9, or projection, is formed along both the entirety of a top portion and along only one portion of two lateral edges of said glazing unit.

In one embodiment illustrated in FIG. 5, the edge face of the interior glass sheet is located beyond the edge face of the plastic sheet and the edge face of the exterior glass sheet over the entirety of the length of the edge face of the interior glass sheet.

Thus, these three edge faces are not aligned with one another, either along the Y-axis in the bottom portion of the glazing, or along the Y-axis in the top portion of the glazing, or along the Y-axis on the sides.

In this embodiment, the centripetal projection is peripheral: it is present along the entirety of the periphery of the glazing; the distance D is preferably constant all the way around the glazing 2.

In the embodiment illustrated in FIG. 5, the protective layer 8 is also completely peripheral: it is present along the entirety of the edge face 51 of the interior glass sheet 5; it is however possible to interrupt the protective layer 8 in the zone, or even in each zone, in which the means for allowing the glazing 2 to be moved translationally with respect to the door of the vehicle are located.

Moreover, in the embodiment illustrated in FIG. 5, the protective layer 8 extends over a distance $d_{g'}$ against the interior face 52 of the interior glass sheet 5 that is larger than the projection distance D of the edge face 51 of the interior glass sheet 5 with respect to the edge face 41 of the plastic sheet 4 and to the edge face 31 of the exterior glass sheet 3. This distance $d_{g'}$ may be comprised between 3.0 and 40.0 mm, or even between 4.0 and 30.0 mm, and may for example be 15.0 mm.

The present invention was described above by way of example. It will be understood that a person skilled in the art will be able to produce various variants of the invention without however departing from the scope of the patent such as defined by the claims.

The invention claimed is:

1. A vehicle part comprising:
a body portion having an opening;
a glazing that is movable with respect to said opening, and
a system coupled to said glazing and configured to allow said glazing to be moved vertically and translationally with respect to said opening, said glazing being curved and laminated and comprising at least an exterior glass sheet, an interior glass sheet and a plastic sheet located between said exterior glass sheet and said interior glass sheet, each sheet having a peripheral edge face, wherein said interior glass sheet is a glass sheet having undergone a chemical tempering operation and having a thickness comprised between 0.40 and 2.10 mm, wherein the edge face of said interior glass sheet is located beyond the edge face of said plastic sheet and beyond the edge face of said exterior glass sheet over only a portion of an entire length of the edge face of said interior glass sheet to form a projection that corresponds to a centripetal offset of said interior sheet relative to said exterior glass sheet and said plastic sheet over said portion, wherein, over said portion, the edge face of the exterior glass sheet forms an uncovered free glass surface that is in direct contact with an exterior environment of the glazing, and
wherein said projection is provided in a visible portion of the glazing unit and is not present in a portion of the glazing unit that remains hidden in an interior of the body portion of the vehicle part.

2. The vehicle part as claimed in claim 1, wherein the edge face of said interior glass sheet includes a protective layer on at least one portion of the length of that edge face of said interior glass sheet which is located beyond the edge face of said plastic sheet and beyond the edge face of said exterior glass sheet.

3. The vehicle part as claimed in claim 2, wherein said protective layer is a varnish having a thickness of about 0.1 to 3.0 mm or is a part made of plastic or of metal or of metal alloy.

4. The vehicle part as claimed in claim 1, further comprising a protective layer that extends over a distance against an exterior face of said interior glass sheet and/or against an interior face of said interior glass sheet, said distance being comprised between 2.0 and 30.0 mm.

5. The vehicle part as claimed in claim 3, wherein said distance is comprised between 3.0 and 20.0 mm.

6. The vehicle part as claimed in claim 3, wherein said distance remains constant on the exterior face of said interior glass sheet and/or the interior face of said interior glass sheet.

7. The vehicle part as claimed in claim 1, wherein the edge face of said interior glass sheet lies beyond the edge face of said plastic sheet and beyond the edge face of said exterior glass sheet at least in the top portion of said glazing unit.

8. The vehicle part as claimed in claim 1, wherein the edge face of said interior glass sheet is aligned with the edge face of said exterior glass sheet in a bottom portion of the glazing.

9. The vehicle part as claimed in claim 1, wherein the edge face of said interior glass sheet lies beyond the edge face of said exterior glass sheet so that the centripetal offset of size comprised between 2.0 and 30.0 mm is formed.

10. The vehicle part as claimed in claim 9, wherein the size of the centripetal offset is comprised between 3.0 and 20.0 mm.

11. The vehicle part as claimed in claim 9, wherein the size of the centripetal offset is constant along its length.

12. The vehicle part as claimed in claim 1, wherein the edge face of said interior glass sheet lies beyond the edge face of said exterior glass sheet so that the centripetal offset is formed along both the entirety of a top portion and along one portion only of a single lateral edge, or indeed so that the centripetal offset is formed along both the entirety of a top portion and along one portion only of two lateral edges of said glazing unit.

13. The vehicle part as claimed in claim 1, wherein the thickness is between 0.40 and 1.80 mm.

14. The vehicle part as claimed in claim 13, wherein the thickness is between 0.40 and 1.60 mm.

15. The vehicle part as claimed in claim 1, wherein the body portion has a recessed profile formed therein, and wherein said system is configured to move said glazing between at least (a) a first position in which the opening is at least partly uncovered by said glazing and said projection is in a visible portion of the glazing and (b) a second position in which the opening is fully covered by said glazing and said recessed profile receives only said projection so that said projection is hidden in said recessed profile.

* * * * *